(12) United States Patent
Masuda et al.

(10) Patent No.: US 12,417,880 B2
(45) Date of Patent: Sep. 16, 2025

(54) ELECTRONIC DEVICE HAVING FIRST AND SECOND METAL TERMINALS

(71) Applicant: TDK CORPORATION, Tokyo (JP)

(72) Inventors: Akihiro Masuda, Tokyo (JP); Shinya Ito, Tokyo (JP); Norihisa Ando, Tokyo (JP); Hideki Kaneko, Tokyo (JP); Ken Aburakawa, Tokyo (JP); Kenya Tamaki, Tokyo (JP); Akitoshi Yoshii, Tokyo (JP)

(73) Assignee: TDK CORPORATION, Tokyo (JP)

( * ) Notice: Subject to any disclaimer, the term of this patent is extended or adjusted under 35 U.S.C. 154(b) by 245 days.

(21) Appl. No.: 17/888,219

(22) Filed: Aug. 15, 2022

(65) Prior Publication Data
US 2023/0064506 A1 Mar. 2, 2023

(30) Foreign Application Priority Data
Aug. 27, 2021 (JP) ................. 2021-139278

(51) Int. Cl.
*H01G 4/224* (2006.01)
*H01G 2/06* (2006.01)
*H01G 2/10* (2006.01)
*H01G 4/12* (2006.01)

(52) U.S. Cl.
CPC ............ *H01G 4/224* (2013.01); *H01G 2/065* (2013.01); *H01G 2/106* (2013.01); *H01G 4/12* (2013.01)

(58) Field of Classification Search
CPC ........... H01G 4/12; H01G 2/065; H01G 4/224
See application file for complete search history.

(56) References Cited

U.S. PATENT DOCUMENTS

| | | | |
|---|---|---|---|
| 2,224,288 A * | 12/1940 | Chapman ............... | H01G 4/224 29/25.42 |
| 2,619,519 A * | 11/1952 | Marks .................... | H01G 4/228 361/321.1 |
| 4,933,811 A * | 6/1990 | Dorlanne ............... | H01G 2/065 361/773 |

(Continued)

FOREIGN PATENT DOCUMENTS

| | | |
|---|---|---|
| JP | H05-029122 U | 4/1993 |
| JP | H06-120009 A | 4/1994 |

(Continued)

*Primary Examiner* — David M Sinclair
(74) *Attorney, Agent, or Firm* — Oliff PLC

(57) ABSTRACT

An electronic device includes a case, a ceramic element, a first metal terminal, and a second metal terminal. The case includes a recess and a case lower surface facing opposite to its opening. The ceramic element is disposed in the recess and includes first and second main surfaces opposing to each other, a first electrode portion formed on the first main surface, and a second electrode portion formed on the second main surface. The first metal terminal includes a first mounting portion disposed on the case lower surface and being substantially parallel to the first and second main surfaces and a first electrode connection portion connected to the first electrode portion. The second metal terminal includes a second mounting portion disposed on the case lower surface and being substantially parallel to the first and second main surfaces and a second electrode connection portion connected to the second electrode portion.

10 Claims, 17 Drawing Sheets

(56) References Cited

U.S. PATENT DOCUMENTS

| | | | | |
|---|---|---|---|---|
| 5,041,696 | A | * | 8/1991 | Utner ................ H01C 17/006 |
| | | | | 361/310 |
| 5,420,745 | A | * | 5/1995 | Hidaka ................ H01G 4/228 |
| | | | | 361/301.3 |
| 6,316,726 | B1 | * | 11/2001 | Hidaka ................ H01G 4/228 |
| | | | | 257/696 |
| 2004/0201949 | A1 | * | 10/2004 | Kida .................... H01G 9/042 |
| | | | | 361/306.1 |
| 2009/0103248 | A1 | * | 4/2009 | Lin ........................ H01G 9/08 |
| | | | | 361/537 |
| 2014/0063688 | A1 | * | 3/2014 | Sasaki .................... H01G 2/08 |
| | | | | 361/308.1 |
| 2017/0178819 | A1 | * | 6/2017 | Wang .................... H01G 4/385 |
| 2018/0182553 | A1 | * | 6/2018 | Yazawa ................ H01G 4/224 |

FOREIGN PATENT DOCUMENTS

| | | | | |
|---|---|---|---|---|
| JP | H06-196348 | A | | 7/1994 |
| JP | 2010-055866 | A | | 3/2010 |
| JP | 2010080639 | A | * | 4/2010 ............... H01G 2/06 |
| KR | 100194294 | B1 | * | 6/1999 |
| WO | WO-2018020993 | A1 | * | 2/2018 ............... H01G 2/02 |

\* cited by examiner

ELECTRONIC DEVICE HAVING FIRST AND SECOND METAL TERMINALS

BACKGROUND OF THE INVENTION

The present invention relates to an electronic device used as a capacitor or the like.

A capacitor or the like configured by connecting a metal terminal to a dielectric disk having a single plate shape has conventionally been proposed. Moreover, an electronic device has also been proposed in which the periphery of the dielectric disk is molded with an exterior material to be suitable for surface mounting.

However, conventional electronic devices for surface mounting require a molding step with an exterior material after fixing a dielectric disk and a metal terminal in a cavity for resin molding and thus have a problem with complexity for assembly process. Moreover, since it is necessary to change the molding die as the size of the dielectric disk changes, there is a problem that it is difficult to flexibly respond to the change in the size of the dielectric disk.

Patent Document 1: JPH06196348 (A)

BRIEF SUMMARY OF THE INVENTION

The present invention has been achieved under such circumstances and provides an electronic device being capable of flexibly responding to the change in the size of an internal ceramic element and having a good productivity.

To achieve the above object, an electronic device comprises:
a case including a recess and a case lower surface facing opposite to an opening of the recess;
a ceramic element disposed in the recess and including:
a first main surface and a second main surface opposing to each other;
a first electrode portion formed on the first main surface; and
a second electrode portion formed on the second main surface;
a first metal terminal including:
a first mounting portion disposed on the case lower surface or next to the case lower surface and being substantially parallel to the first main surface and the second main surface; and
a first electrode connection portion connected to the first electrode portion; and
a second metal terminal including:
a second mounting portion disposed on the case lower surface or next to the case lower surface and being substantially parallel to the first main surface and the second main surface; and
a second electrode connection portion connected to the second electrode portion.

Since the ceramic element is accommodated in the recess of the case, the electronic device according to the present invention does not need to have a molding step with an exterior material after disposing the ceramic element and the like in the cavity for resin molding and is excellent in productivity.

For example, the electronic device according to the present invention may further comprise a case cover for covering the opening, wherein
the first metal terminal passes through a first space formed between the case and the case cover, and
the second metal terminal passes through a second space formed between the case and the case cover and being away from the first space.

In such an electronic device, the member, such as the ceramic element, disposed in the recess can favorably be protected by the case cover. Moreover, the case cover constitutes an adsorption surface by a mounting machine or the like during surface mounting, and such an electronic device is thus favorable for surface mounting. The first metal terminal and the second metal terminal can favorably seal the inside of the case by passing through the spaces formed between the case and the case cover. In the electronic device according to the present invention, the spaces of the recess of the case may be filled with a mold resin. In such a case, the electronic device including the case cover has a wide selection range of a mold resin because the mold resin is not exposed outside by the case cover.

For example, the case cover may be disposed corresponding to a corner of the opening and include a plurality of protrusion portions for being inserted into the recess.

The case cover including the protrusions can be positioned easily and precisely to the case and can be fixed firmly to the case.

For example, a recess depth from the opening of the case to a bottom surface of the recess may be larger than an element thickness as a distance between the first main surface and the second main surface.

In such an electronic device, the whole of the ceramic element can be accommodated in the recess without exposure from the opening of the recess. When the case cover is used, the shape of the case cover can be simplified. When the recess is filled with a mold resin, the whole of the ceramic element can be covered with the mold resin.

For example, the ceramic element may include:
a first section having the first main surface, the first electrode portion, and a first dielectric portion; and
a second section having the second main surface, the second electrode portion, and a second dielectric portion, and
the first section and the second section may be connected via an intermediate electrode portion.

The ceramic element disposed in the recess may be one single-plate ceramic element, but may be a combination of a plurality of plate-shaped portions like the first section and the second section. Such an electronic device is configured by the first dielectric portion and the second dielectric portion connected in series.

For example, the ceramic element may include a first element portion and a second element portion each having the first main surface and the second main surface,
the first element portion and the second element portion may be arranged so that their second main surfaces face each other,
the second electrode connection portion may be interposed between the second main surfaces of the first element portion and the second element portion so as to be in contact with both of the second electrode portions of the first element portion and the second element portion, and
the first electrode connection portion may include:
a first element connection portion connected to the first electrode portion of the first element portion; and
a second element connection portion connected to the first electrode portion of the second element portion.

The ceramic element disposed in the recess may be one single-plate ceramic element, but may be a combination of a plurality of plate-shaped dielectric portions like the first element portion and the second element portion. Such an electronic device is configured by the first element portion and the second element portion connected in parallel.

For example, the first metal terminal and the second metal terminal may be arranged on the case lower surface, and the case lower surface may include a recess groove facing at least one of the first mounting portion and the second mounting portion and having a changing groove depth.

For example, the recess groove unit may include:
a first recess groove where a space formed with a tip of the first mounting portion is larger than a space formed with a base end of the first mounting portion; and
a second recess groove where a space formed with a tip of the second mounting portion is larger than a space formed with a base end of the second mounting portion.

In such an electronic device, the ceramic element and the first and second electrode connection portions are assembled in the case, and the first mounting portion and the second mounting portion substantially parallel to the first main surface and the second main surface can thereafter be arranged on the case lower surface by processing the first electrode portion and the second electrode portion. This makes it possible to fix the first electrode portion and the second electrode portion to the ceramic element before fixing these members to the case. Thus, such an electronic device can precisely form the first mounting portion and the second mounting portion and is excellent in productivity.

BRIEF DESCRIPTION OF THE DRAWING(S)

DETAILED DESCRIPTION OF THE INVENTION

Hereinafter, the present invention is explained based on embodiments shown in the figures.

First Embodiment

Figure 1:
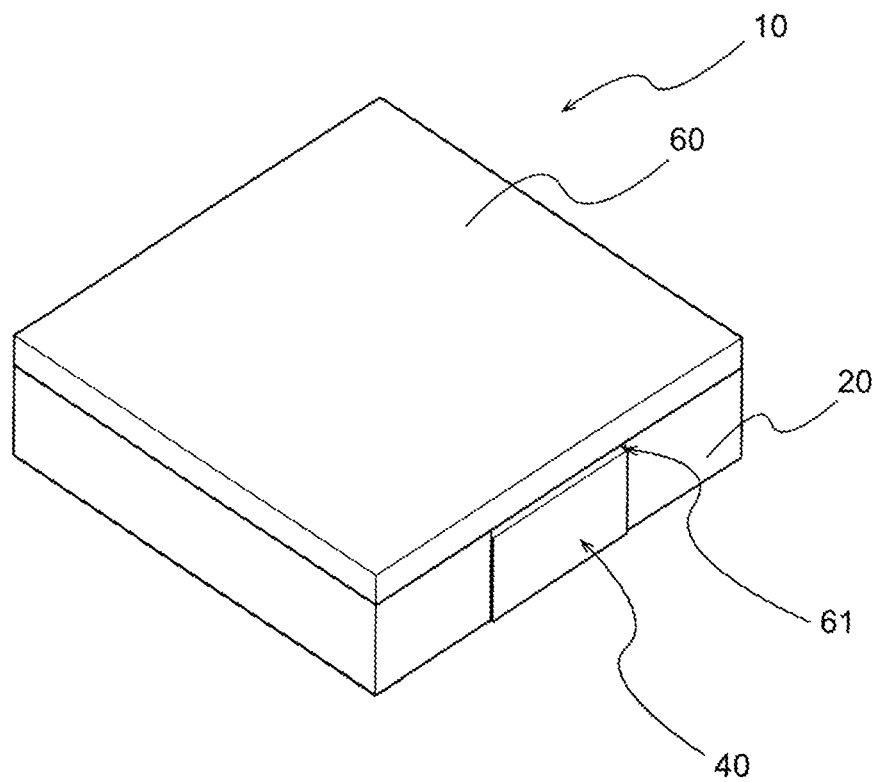
FIG. 1 is a schematic oblique view of an electronic device according to First Embodiment of the present invention from diagonally above.
Figure 3:
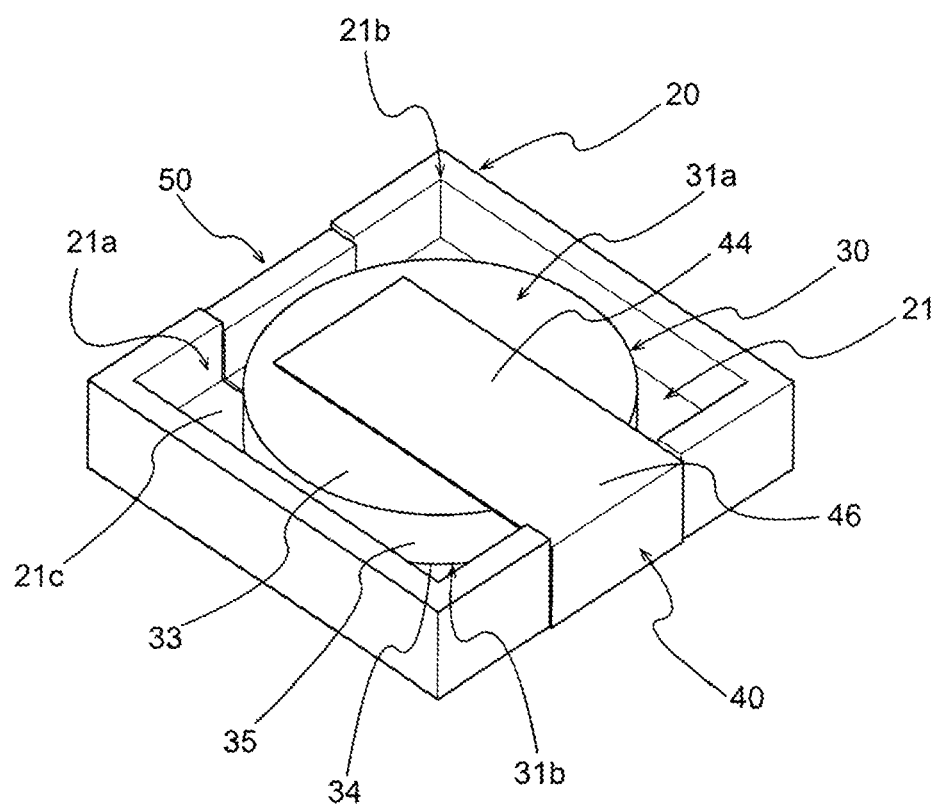
FIG. 3 is a schematic oblique view illustrating an internal state of a case of the electronic device shown in FIG. 1.

FIG. 1 is a schematic oblique view of an electronic device 10 according to First Embodiment of the present invention from diagonally above. As shown in FIG. 1, the electronic device 10 includes a case 20 and a case cover 60 for covering an opening 21a (see FIG. 3) of the case 20. As shown in FIG. 3, which illustrates the electronic device 10 excluding the case cover 60, the electronic device 10 includes a ceramic element 30 accommodated inside the case, a first metal terminal 40 connected to a first electrode portion 33 of the ceramic element 30, and a second metal terminal 50 connected to a second electrode portion 34 of the ceramic element 30.

As shown in FIG. 1, the electronic device 10 has a substantially rectangular flat plate shape, but is not limited to this and may have another polygonal flat plate shape other than rectangle or a disk shape. As shown in FIG. 3, the opposite side to the side where the case cover 60 is disposed is the mounting surface side of the electronic device 10 opposing to a board or the like as a mounting target when the electronic device 10 is mounted.

As shown in FIG. 3, the case 20 includes a recess 21 and accommodates the ceramic element 30 and the like in the recess 21. The recess 21 has a rectangular shape that is one size smaller than the outer shape of the case 20 when viewed from the opening side of the recess 21, and a substantially rectangular parallelepiped space is formed in the case 20. The opening 21a of the recess 21 is formed in the case 20 so as to open upward (the opposite side to the mounting surface) in the electronic device 10.

Figure 2:
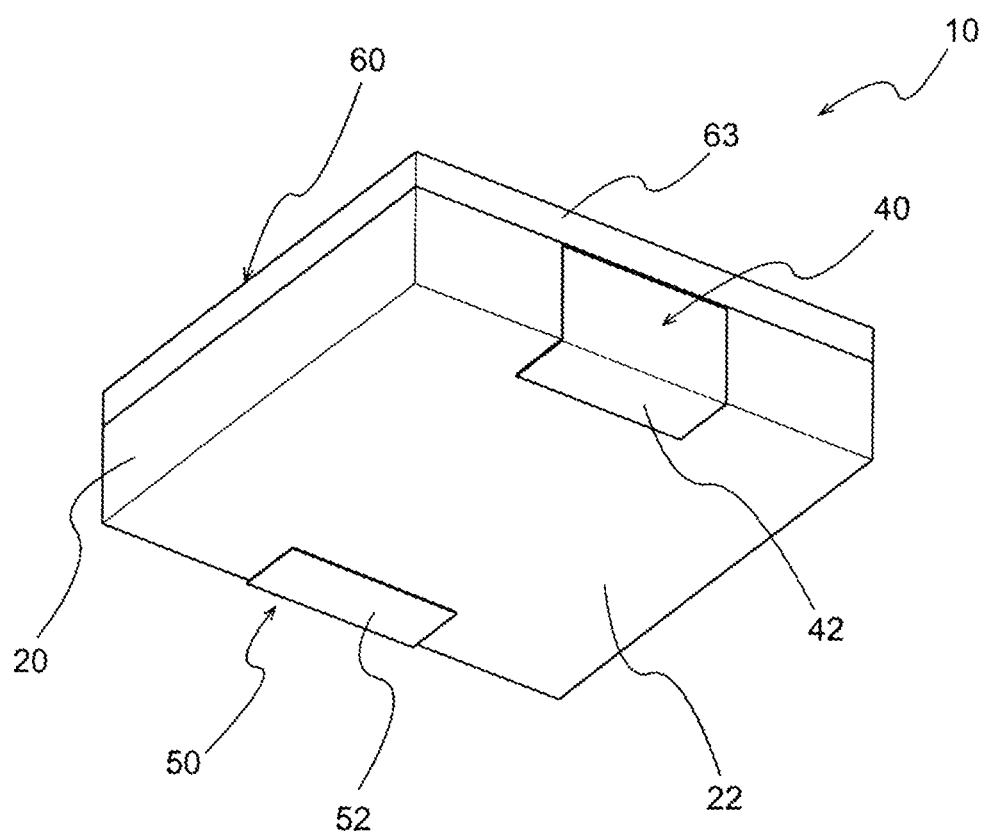
FIG. 2 is a schematic oblique view of the electronic device shown in FIG. 1 from diagonally below.

FIG. 2 is an oblique view of the electronic device 10 as viewed from diagonally below. As shown in FIG. 2, the case 20 includes a case lower surface 22 facing opposite to the opening 21a of the recess 21. A first mounting portion 42 of the first metal terminal 40 and a second mounting portion 52 of the second metal terminal 50 are arranged on the case lower surface 22.

As shown in FIG. 3, the ceramic element 30 is disposed in the recess 21 of the case 20. The ceramic element 30 includes a first main surface 31a and a second main surface 31b opposing to each other and has a substantially disk-shaped outer shape. However, the ceramic element 30 may have a shape other than the disk shape, such as an elliptical disk shape and a rectangular flat plate shape. The first main surface 31a and the second main surface 31b are a pair of surfaces having the largest area in the ceramic element 30. In the description of the ceramic element 30, as shown in FIG. 3, one of the two main surfaces facing upward is referred to as the first main surface 31a, and the other facing downward is referred to as the second main surface 31b. On the contrary, however, the main surface facing downward may be the first main surface 31a, and the main surface facing upward may be the second main surface 31b.

Figure 5:
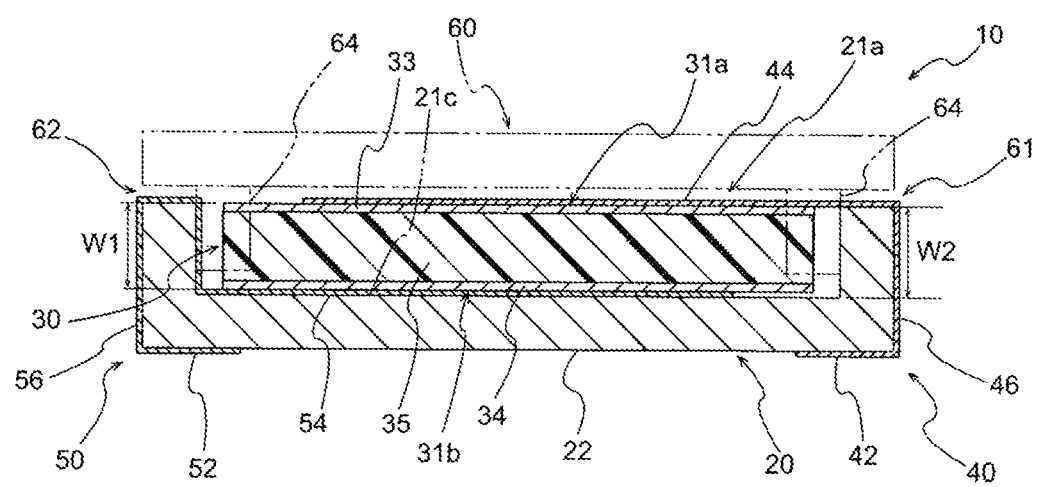
FIG. 5 is a cross-sectional view of the electronic device shown in FIG. 1.

As shown in FIG. 5, which is a cross-sectional view of the electronic device 10, the ceramic element 30 includes a first electrode portion 33 formed on the first main surface 31a, a second electrode portion 34 formed on the second main surface 31b, and a dielectric portion 35 interposed between the first electrode portion 33 and the second electrode portion 34. The material of the dielectric portion 35 is not limited and is, for example, a dielectric material, such as calcium titanate, strontium titanate, barium titanate, and a mixture thereof. In FIG. 5, the case cover 60 is illustrated by virtual lines (dashed-dotted lines). The ceramic element 30 is not limited to a capacitor or the like interposing the dielectric portion 35 between the first electrode portion 33 and the second electrode portion 34. For example, the ceramic element may be a varistor or a thermistor interposing a semiconductor ceramics between the first electrode portion and the second electrode portion.

The first electrode portion 33 and the second electrode portion 34 are also made of any material and are normally made of copper, a copper alloy, nickel, a nickel alloy, or the like, but can also be made of silver, an alloy of silver and palladium, or the like. The first electrode portion 33 and the second electrode portion 34 have any thickness, but normally have a thickness of about 10 to 50 µm. In addition, at least one metal film selected from Ni, Cu, Sn, etc. may be formed on the surfaces of the first and second electrode portions 33 and 34.

As shown in FIG. 5, W2 is larger than W1, where W1 is an element thickness as a distance from the first main surface 31a to the second main surface 31b of the ceramic element 30, and W2 is a recess depth as a distance from the opening 21a of the case 20 to a bottom surface 21c (see FIG. 4 etc.) of the recess 21. Thus, the electronic device 10 can accommodate the whole of the ceramic element 30 in the recess 21 without exposing a part of the ceramic element 30 from the opening 21a of the recess 21. Moreover, the electronic device 10 can have a simplified shape of the case cover 60. When the recess 21 is filled with a mold resin, the whole of the ceramic element 30 can be covered with the mold resin.

As shown in FIG. 2 and FIG. 3, the electronic device 10 includes a pair of metal terminals 40 and 50. The first metal terminal 40 and the second metal terminal 50 are arranged away and electrically insulated from each other in the electronic device 10. The first metal terminal 40 and the second metal terminal 50 are formed by, for example, machining a conductive metal plate, but the metal terminals 40 and 50 are formed by any method.

As shown in FIG. 5, the first metal terminal 40 includes the first mounting portion 42 disposed on the case lower surface 22, a first electrode connection portion 44 connected to the first electrode portion 33 of the ceramic element 30, and a first terminal arm portion 46 connecting between the first mounting portion 42 and the first electrode connection portion 44. Similarly to the ceramic element 30, the first electrode connection portion 44 is accommodated in the recess 21 of the case 20.

As shown in FIG. 2, the first mounting portion 42 is disposed on one side of the case lower surface 22. As shown in FIG. 5, the first mounting portion 42 is substantially parallel to the first main surface 31a and the second main surface 31b of the ceramic element 30.

As shown in FIG. 3 and FIG. 5, a part of the first terminal arm portion 46 of the first metal terminal 40 is disposed in the recess 21 of the case 20, and another part is disposed outside the recess 21. That is, the first terminal arm portion 46 passes through a first space 61 (see FIG. 5) formed between the case 20 and the case cover 60 and connects between the first electrode connection portion 44 inside the recess 21 and the first mounting portion 42 outside the recess 21.

As shown in FIG. 5, the second metal terminal 50 includes the second mounting portion 52 disposed on the case lower surface 22, a second electrode connection portion 54 connected to the second electrode portion 34 of the ceramic element 30, and a second terminal arm portion 56 connecting between the second mounting portion 52 and the second electrode connection portion 54. Similarly to the first electrode connection portion 44, the second electrode connection portion 54 is accommodated in the recess 21 of the case 20. The second electrode connection portion 54 is disposed so as to be interposed from above and below by the bottom surface 21c of the recess 21 and the second main surface 31b of the ceramic element 30.

As shown in FIG. 2, the second mounting portion 52 is disposed on the other side of the case lower surface 22 at an interval to the first mounting portion 42. As shown in FIG. 5, the second mounting portion 52 is disposed on the same plane as the first mounting portion 42 and is substantially parallel to the first main surface 31a and the second main surface 31b of the ceramic element 30.

Figure 4:
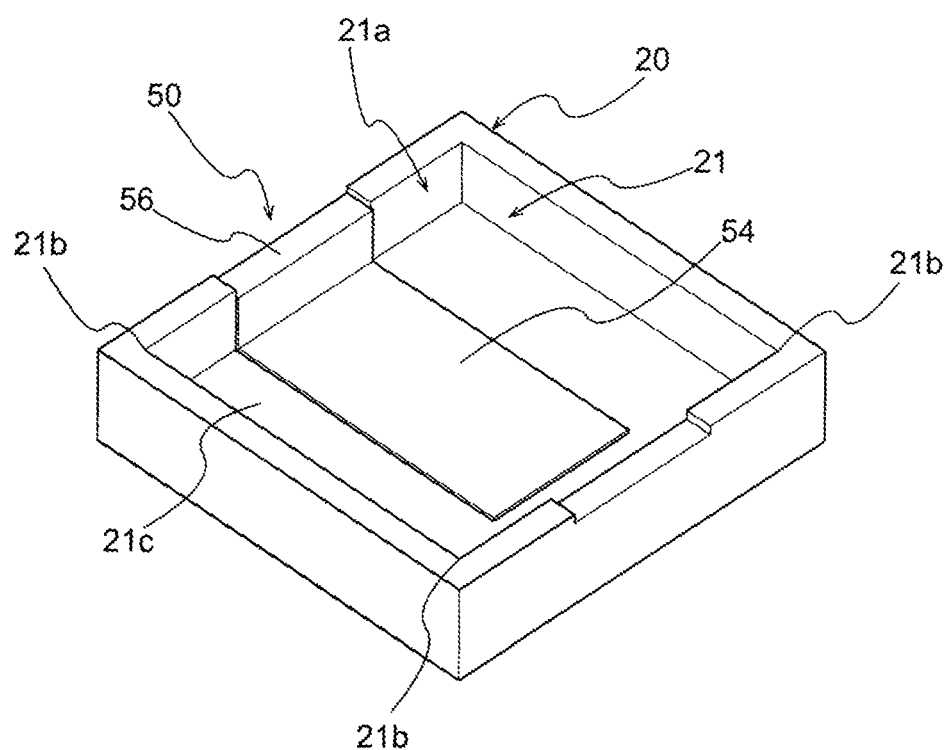
FIG. 4 is a schematic oblique view illustrating a case and a second metal terminal of the electronic device shown in FIG. 1.

As shown in FIG. 4 and FIG. 5, a part of the second terminal arm portion 56 of the second metal terminal 50 is disposed in the recess 21 of the case 20, and another part is disposed outside the recess 21. That is, the second terminal arm portion 56 passes through a second space 62 (see FIG. 5) formed between the case 20 and the case cover 60 and connects between the second electrode connection portion 54 inside the recess 21 and the second mounting portion 52 outside the recess 21.

The first metal terminal 40 and the second metal terminal 50 shown in FIG. 5 and the like are made of any metal material having conductivity, such as iron, nickel, copper, silver, and an alloy containing these. A metal film, such as Ni, Sn, and Cu, may be formed on the surfaces of the first metal terminal 40 and the second metal terminal 50.

Figure 6:
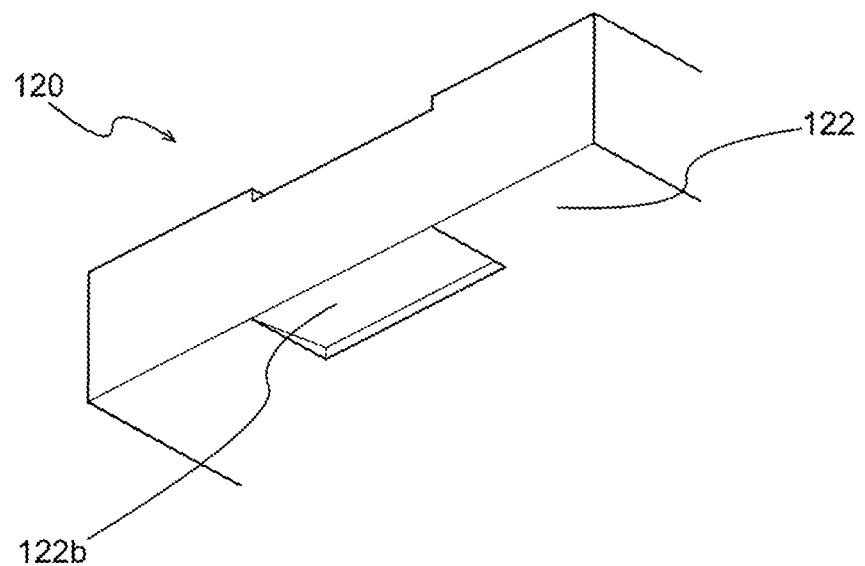
FIG. 6 is a partial oblique view illustrating a case lower surface according to First Modification.

As shown in FIG. 2, the case cover 60 is disposed on the other side of the case lower surface 22 of the case 20 and covers the opening 21a of the recess 21 shown in FIG. 3 and FIG. 4. The case cover 60 includes a rectangular flat plate-shaped cover body 63 having substantially the same shape as the case 20 when viewed from above as shown in FIG. 6 and a plurality (four in the embodiment) of protrusions 64 protruding downward from the corners of the cover body 63 (see FIG. 5).

In the electronic device 10, the case cover 60 seals the recess 21, and it is thereby possible to favorably protect the member, such as the ceramic element 30, disposed in the recess 21. The frame-shaped upper end of the case 20 shown in FIG. 3 is connected to the lower surface of the cover body 63, and the case cover 60 covers the opening 21a of the recess 21. However, the first space 61 passed by the first metal terminal 40 and the second space 62 passed by the second metal terminal 50 are formed between the case cover 60 and the case 20.

As shown in FIG. 5, the protrusions 64 of the case cover 60 are arranged corresponding to corners 21b (see FIG. 4) of the opening 21a of the case 20 and are inserted in the recess 21 in a state where the case cover 60 covers the opening 21a. The case cover 60 including the protrusions 64 can be positioned easily and precisely to the case 20 and can be fixed firmly to the case 20.

The recess 21 of the case 20 shown in FIG. 3 may be filled with a mold resin for filling the gap between: the inner wall (including the bottom surface 21c) of the recess 21; and the ceramic element 30 and the metal terminals 40 and 50. This can improve the strength, insulating property, and the like of the electronic device 10. However, the recess 21 is not necessarily filled with resin. As shown in FIG. 3, a gap may be formed between: the inner wall of the recess 21; and the ceramic element 30 and the metal terminals 40 and 50.

The case 20 and the case cover 60 can be manufactured by, for example, injection molding with resin. However, the materials of the case 20 and the case cover 60 are not limited to only resin.

The electronic device 10 shown in FIG. 1 to FIG. 5 can be manufactured by, for example, the following steps. First, the ceramic element 30 and the first and second metal terminals 40 and 50 are prepared, and the first metal terminal 40 and the second metal terminal 50 are connected to the ceramic element 30. The ceramic element 30 and the first and second metal terminals 40 and 50 can be connected by solder, conductive adhesive, or the like.

The step of connecting the first metal terminal 40 and the second metal terminal 50 to the ceramic element 30 is carried out in a state where the mounting portions 42 and 52 of the first metal terminal 40 and the second metal terminal 50 are not folded. This is because, if the first and second metal terminals 40 and 50 and the ceramic element 30 are integrated in a state where the mounting portions 42 and 52 are folded, it is difficult to dispose the ceramic element 30 integrated with the metal terminals 40 and 50 in the recess 21 of the case 20.

Next, an intermediate manufactured product formed by integrating the first metal terminal 40, the second metal terminal 50, and the ceramic element 30 is disposed in the recess 21 of the case 20, and the opening 21*a* is thereafter closed by the case cover 60. At this time, a mold resin is injected into the recess 21 before closing the opening 21*a* by the case cover 60, and the mold resin is cured after attaching the case cover 60. This firmly fixes the case cover 60 and the case 20 via the mold resin.

Finally, the first mounting portion 42 and the second mounting portion 52 are formed by bending the tips of the first metal terminal 40 and the second metal terminal 50 exposed outside from the recess 21 of the case 20 to obtain the electronic device 10 shown in FIG. 1. As described above, since the ceramic element 30 is accommodated in the recess 21 in the case 20, the electronic device 10 shown in FIG. 1 to FIG. 5 does not need to have a molding step with an exterior material after disposing the ceramic element 30 and the like in the cavity for resin molding and is excellent in productivity.

Since the ceramic element 30 and the like can be accommodated in the case 20, the electronic device 10 can flexibly respond to a change in the size of the ceramic element 30 as long as the ceramic element 30 and the like can be accommodated in the case 20. Moreover, since the first mounting portion 42 and the second mounting portion 52 are parallel to the first main surface 31*a* and the second main surface 31*b* of the ceramic element 30, the electronic device 10 is advantageous for low profile and is suitable for surface mounting.

The electronic device 10 according to First Embodiment mentioned above is only an embodiment of the present invention. Needless to say, the technical scope of the present invention includes many other embodiments and modifications. For example, FIG. 6 is a partial perspective view of a case 120 according to a modified example, and the case 120 can be adopted instead of the case 20 of the electronic device according to First Embodiment.

Figure 7A:
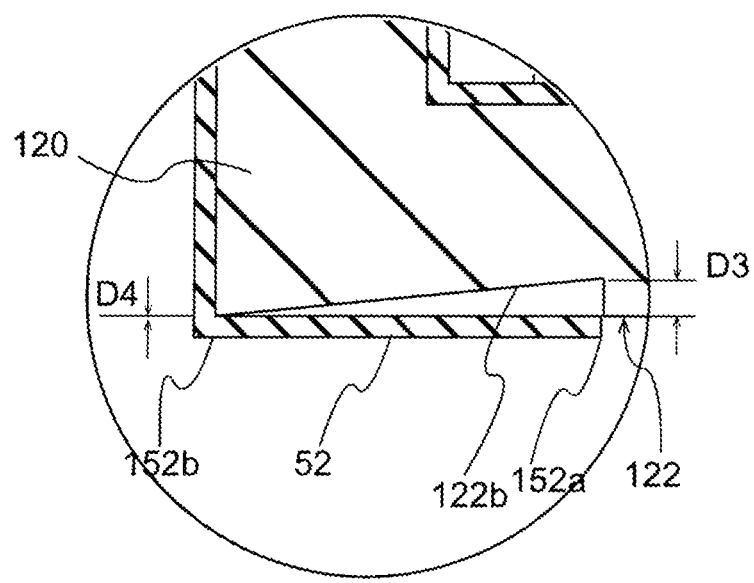
FIG. 7A and FIG. 7B are conceptual diagrams each illustrating a space between a case lower surface and a mounting portion according to First Modification.

As shown in FIG. 6, a case lower surface 122 of the case 120 is provided with a second recess groove 122*b* as a recess groove unit 122*c* facing the second mounting portion 52 and having a changing groove depth. FIG. 7A is a partial cross-sectional view illustrating the surroundings of the second mounting portion 52 in the electronic device employing the case 120. As shown in FIG. 7A, the second recess groove 122*b* formed on the case lower surface 122 is inclined to the second mounting portion 52 so that a space D3 formed with a tip 152*a* of the second mounting portion 52 is larger than a space D4 formed with a base end 152*b* of the second mounting portion 52.

Figure 7B:
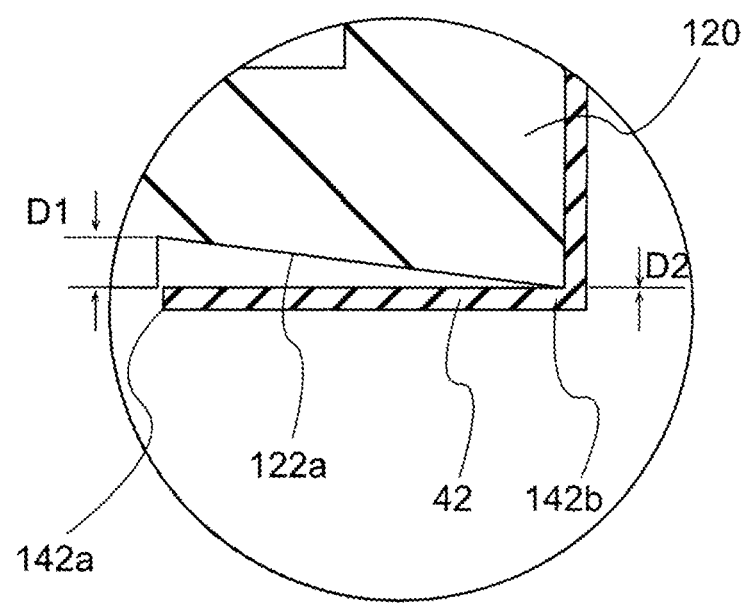

As shown in FIG. 7B, which illustrates the surroundings of the first mounting portion 42, in addition to the second recess groove 122*b*, the case lower surface 122 of the case 120 is provided with a first recess groove 122*a* as the recess groove unit 122*c* facing the first mounting portion 42 and having a changing groove depth. The first recess groove 122*a* is inclined to the first mounting portion 42 so that a space D1 formed with a tip 142*a* of the first mounting portion 42 is larger than a space D2 formed with a base end 142*b* of the first mounting portion 42.

Since the first recess groove 122*a* and the second recess groove 122*b* are formed on the case lower surface 122, when the first mounting portion 42 and the second mounting portion 52 are formed by bending in the above-mentioned manufacturing process, for example, an appropriate bending angle in consideration of the springback during processing can be easily given to the base ends 142*b* and 152*b* of the first and second mounting portions 42 and 52. Thus, in the electronic device using the case 120, the first mounting portion 42 and the second mounting portion 52 can be formed accurately and easily. The recess groove unit 122*c* faces at least one of the first mounting portion 42 and the second mounting portion 52 and is not limited to only those separated into the first groove 122*a* and the second groove 122*b*. For example, the recess groove unit 122*c* may be configured by one continuous groove.

Second Embodiment

Figure 8:
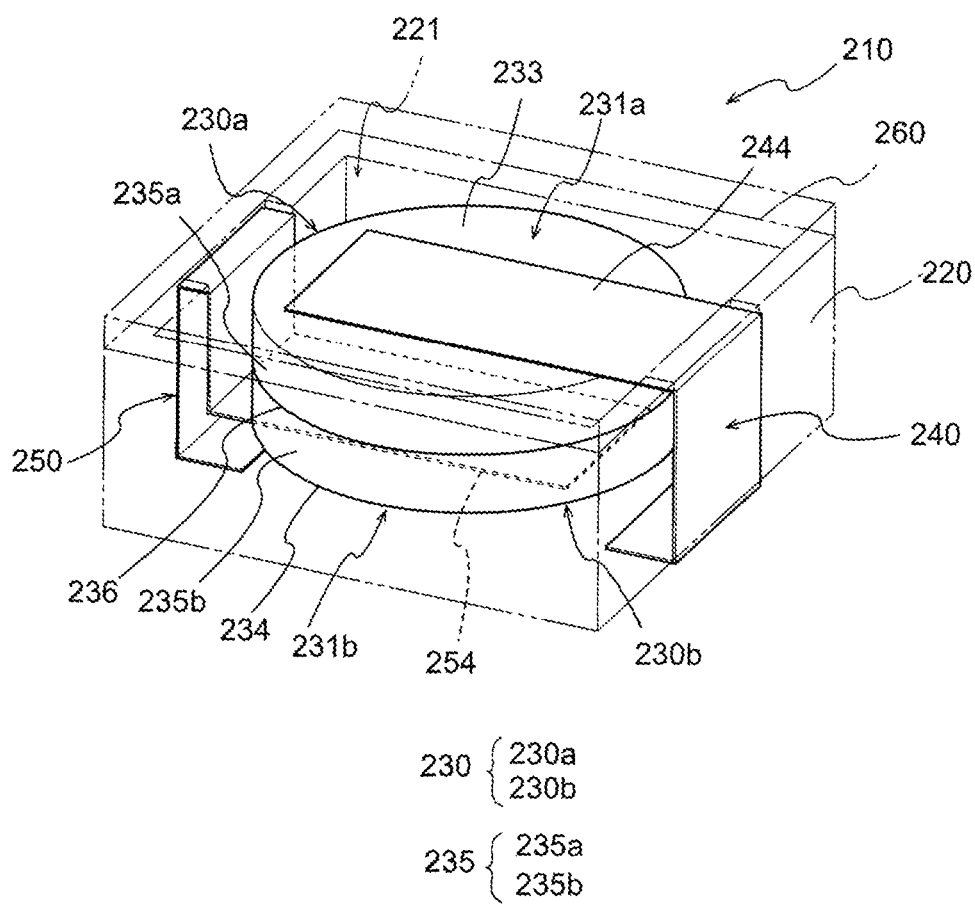
FIG. 8 is a schematic oblique view of an electronic device according to Second Embodiment of the present invention from diagonally above.

FIG. 8 is a schematic oblique view of an electronic device 210 according to Second Embodiment of the present invention. FIG. 8 illustrates the inside of a case 220 of the electronic device 210 in a transparent manner and illustrates the case 220 and a case cover 260 by virtual lines.

The electronic device 210 is different from the electronic device 10 shown in FIG. 1 to FIG. 5 in that a ceramic element 230 is configured by combining two single-plate-like dielectric elements of a first section 230*a* and a second section 230*b*. Except for the dimension in the depth direction from the opening of the case 220 toward the bottom surface of a recess 221, however, the electronic device 210 is similar to the electronic device 10 according to First Embodiment in terms of the case 220, the case cover 260, a first metal terminal 240, and a second metal terminal 250 other than the ceramic element 230. In the description of the electronic device 210, only the differences from the electronic device 10 are described, and common respects with the electronic device 10 are not described.

As shown in FIG. 8, the ceramic element 230 of the electronic device 210 includes the first section 230*a* and the second section 230*b*. The first section 230*a* is disposed near the opening of the recess 221, and the second section 230*b* is disposed near the bottom of the recess 221.

The first section 230*a* includes first main surface and electrode portion 231*a* and 233 and a first dielectric portion 235a. The first dielectric portion 235a constitutes a part of the dielectric portion 235 of the ceramic element 230. Similarly to the first electrode portion 33 shown in FIG. 5, a first electrode connection portion 244 of a first metal terminal 240 is connected to the first electrode portion 233.

The second section 230b includes second main surface and electrode portion 231b and 234 and a second dielectric portion 235b. The second dielectric portion 235b constitutes another part of the dielectric portion 235 of the ceramic element 230. Similarly to the second electrode portion 34 shown in FIG. 5, a second electrode connection portion 254 of a second metal terminal 250 is connected to the second electrode portion 234.

As shown in FIG. 8, the first section 230a and the second section 230b are contacted via an intermediate electrode portion 236 formed on their surfaces opposing to each other and are electrically connected in series. Similarly to the first electrode portion 233 and the second electrode portion 234, the intermediate electrode portion 236 is made of copper, a copper alloy, nickel, a nickel alloy, silver, an alloy of silver and palladium alloy, or the like.

In the electronic device 210 shown in FIG. 8, the ceramic element 230 disposed in the recess 221 is not configured by one single plate like the electronic device 10, but is configured by a combination of a plurality of plate-shaped dielectrics 230a and 230b. The electronic device 210 functions as a capacitor or the like formed by the first dielectric portion 235a and the second dielectric portion 235b connected in series. As for common respects with the electronic device 10, the electronic device 210 exhibits effects similar to those of the electronic device 10.

Third Embodiment

Figure 9:
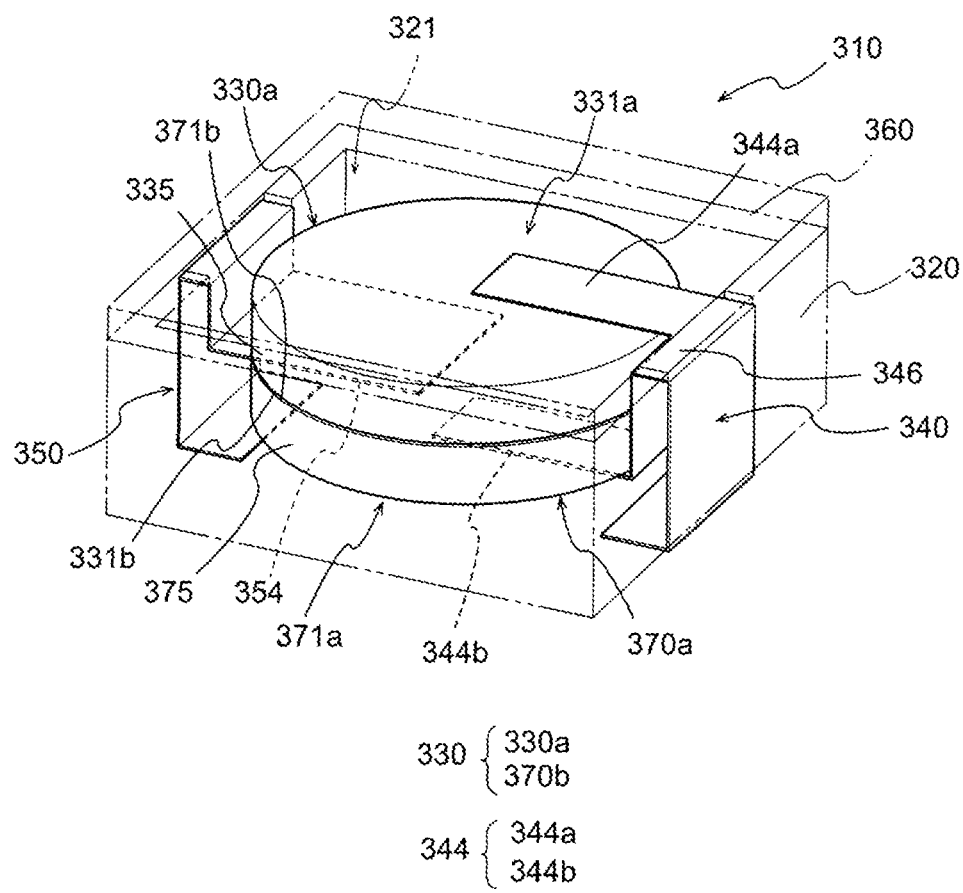
FIG. 9 is a schematic oblique view of an electronic device according to Third Embodiment of the present invention from diagonally above.

FIG. 9 is a schematic oblique view of an electronic device 310 according to Third Embodiment of the present invention. Similarly to the electronic device 210 shown in FIG. 8, FIG. 9 illustrates the inside of a case 320 of the electronic device 310 in a transparent manner and illustrates the case 320 and a case cover 360 by virtual lines.

As shown in FIG. 9, the electronic device 310 is different from the electronic device 10 shown in FIG. 1 to FIG. 5 in terms of a ceramic element 330 configured by a combination of two short plate-shaped dielectric elements of a first element portion 330a and a second element portion 370a and the shapes of a first metal terminal 340 and a second metal terminal 350. Except for the dimension in the depth direction from the opening of the case 320 toward the bottom of the recess 321, however, the case 320 and the case cover 360 of the electronic device 310 are similar to the case 20 and the case cover 60 of the electronic device 10 according to First Embodiment. In the description of the electronic device 310, only the differences from the electronic device 10 are described, and common respects with the electronic device 10 are not described.

As shown in FIG. 9, the first element portion 330a of the electronic device 310 is disposed near the opening of the recess 321. The first element portion 330a includes first and second main surfaces 331a and 331b opposing to each other and a dielectric portion 335 and is similar to the ceramic element 30 of the electronic device 10 shown in FIG. 3. Similarly to the ceramic element 30, the first element portion 330a of the electronic device 310 includes a first electrode portion formed on the first main surface 331a and a second electrode portion formed on the second main surface 331b.

The second element portion 370a of the electronic device 310 is disposed near the bottom surface of the recess 321. Similarly to the first element portion 330a, the second element portion 370a includes first and second main surfaces 371a and 371b and a dielectric portion 375. On the contrary to the first element portion 330a, however, the second element portion 370a is disposed in a posture where the second main surface 371b faces upward (the opening side of the recess).

Thus, the first element portion 330a and the second element portion 370a are arranged so that their second main surfaces 331b and 371b face each other. Similarly to the ceramic element 30, the second element portion 370a of the electronic device 310 also includes a first electrode portion formed on the first main surface 371a and a second electrode portion formed on the second main surface 371b.

The second metal terminal 350 of the electronic device 310 includes a second electrode connection portion 354 interposed between the second main surfaces 331b and 371b of the first element portion 330a and the second element portion 370a so that the second electrode connection portion 354 is in contact with both of the second electrode portions of the first element portion 330a and the second element portion 370a. That is, the second electrode connection portion 354 is inserted between the first element portion 330a and the second element portion 370a. The other parts of the second metal terminal 350 are similar to those of the second metal terminal 50 (see FIG. 5) or the second metal terminal 250 (see FIG. 8).

The first metal terminal 340 of the electronic device 310 includes a first electrode connection portion 344 including a first element connection portion 344a and a second element connection portion 344b branched into two from a first terminal arm portion 346 of the first metal terminal 340. The first element connection portion 344a is connected to a first electrode portion formed on the first main surface 331a of the first element portion 330a. The second element connection portion 344b is connected to a first electrode portion formed on the first main surface 371a of the second element portion 370a. Thus, as shown in FIG. 9, in the electronic device 310, the whole of the ceramic element 330 is interposed between the first element connection portion 344a and the second element connection portion 344b of the first metal terminal 340.

In the electronic device 310 shown in FIG. 9, the ceramic element 330 disposed in the recess 321 is not configured by one single plate like the electronic device 10, but is configured by a combination of a plurality of plate-shaped element portions 330a and 370a. The electronic device 310 functions as a capacitor or the like formed by the dielectric portion 335 of the first element portion 330a and the dielectric portion 375 of the second element portion 370a connected in parallel. As for common respects with the electronic device 10, the electronic device 310 exhibits effects similar to those of the electronic device 10.

A single-plate dielectric element similar to the ceramic element 30 of First Embodiment can be applied to the first section 230a, the second section 230b, the first element portion 330a, and the second element portion 370a of Second and Third Embodiments. Thus, the electronic devices 10, 210, and 310 having different characteristics can be manufactured using the same single-plate ceramic element 30 by preparing the cases 20, 220, and 320 and the metal terminals 30, 40, 230, 240, 330, and 340 having different shapes.

Fourth Embodiment

Figure 10:
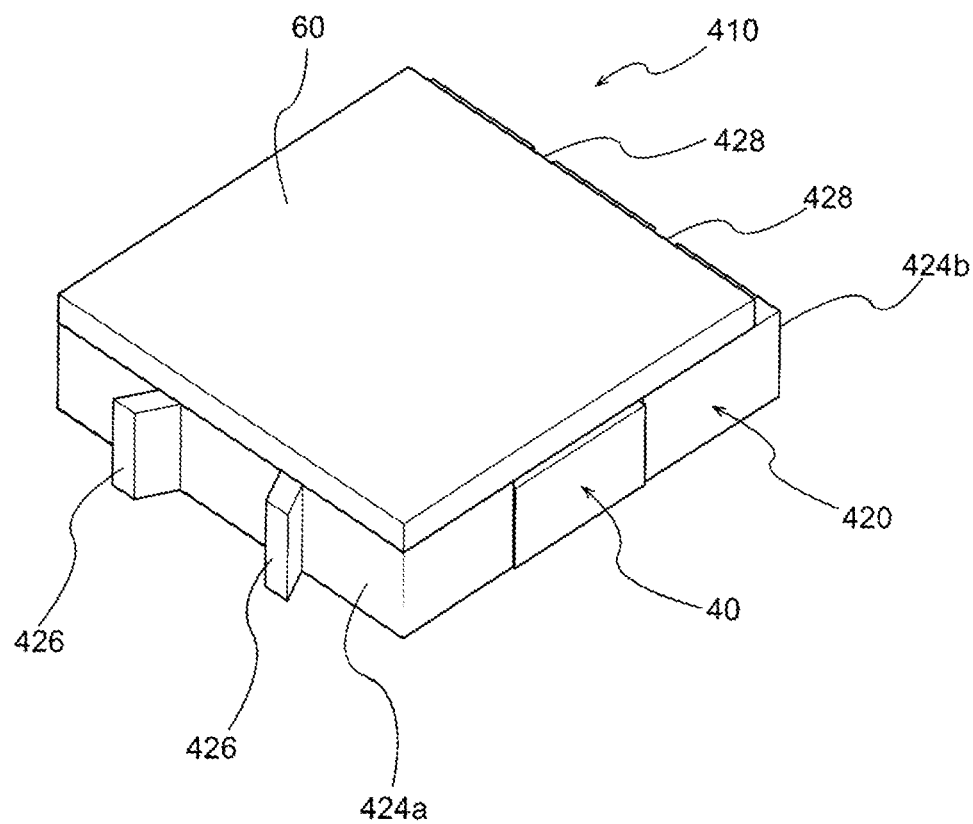
FIG. 10 is a schematic oblique view of an electronic device according to Fourth Embodiment of the present invention from diagonally above.

FIG. 10 is a schematic oblique view of an electronic device 410 according to Fourth Embodiment. As shown in FIG. 10, the electronic device 410 is different from the electronic device 10 shown in FIG. 1 in terms of engagement protrusions 426 formed on a case first side surface 424a of a case 420 and engagement grooves 428 formed on a case second side surface 424b of the case 420. Except for the engagement protrusions 426 and the engagement grooves 428 formed on the case 420, however, the electronic device 410 is similar to the electronic device 10 shown in FIG. 1. In the description of the electronic device 410, only the differences from the electronic device 10 are described, and common respects with the electronic device 10 are not described.

As shown in FIG. 10, the case first side surface 424a provided with the engagement protrusions 426 is a surface perpendicular to the side surface provided with the first metal terminal 40. The engagement protrusions 426 are formed so as to protrude diagonally outward from a surface perpendicular to the mounting surface or the like. The engagement protrusions 426 are formed at two positions on the case first side surface 424a at an interval of each other.

Figure 11:
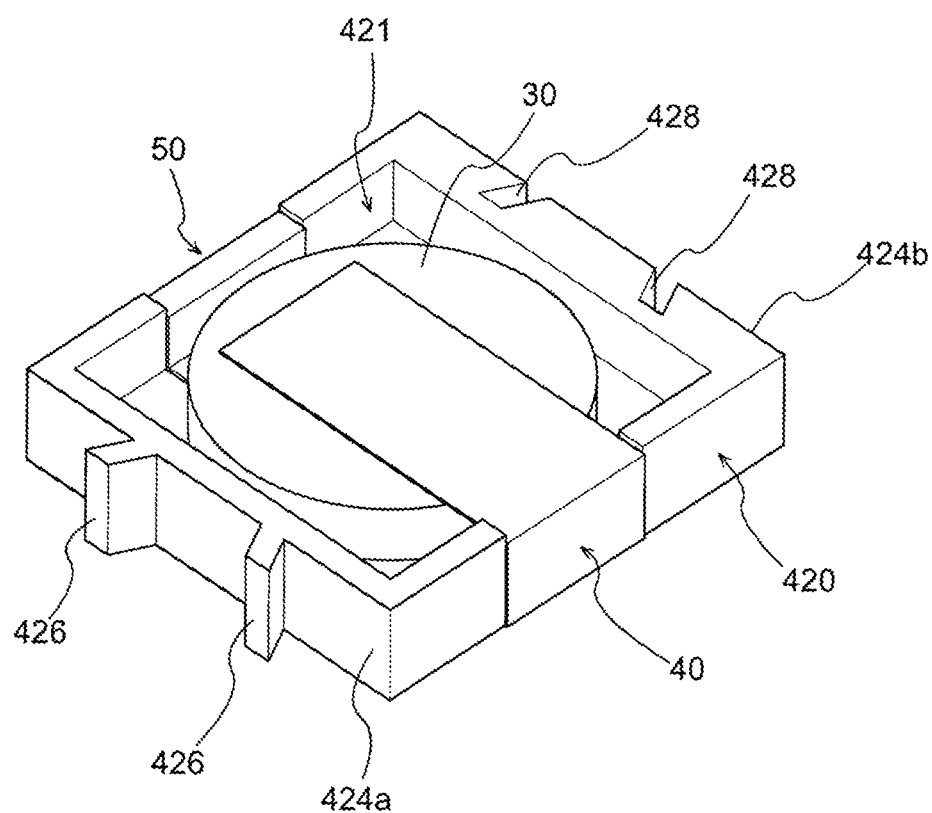
FIG. 11 is a schematic oblique view illustrating an internal state of a case of the electronic device shown in FIG. 10.

FIG. 11 illustrates the electronic device 410 shown in FIG. 10 in a state where the case cover 60 is hidden. As shown in FIG. 11, a recess 421 is formed in the case 420 as in the case 20 shown in FIG. 3, and the ceramic element 30, a part of the first metal terminal 40, and a part of the second metal terminal 50 are arranged in the recess 421.

Figure 13:
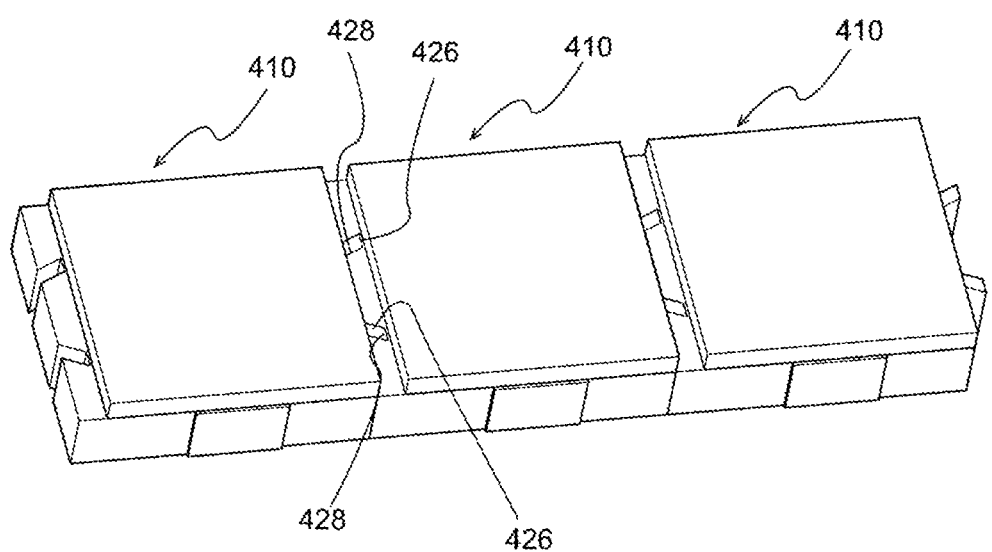
FIG. 13 is a conceptual diagram illustrating an example of the usage state of the electronic device shown in FIG. 10.

As shown in FIG. 11, the case second side surface 424b provided with the engagement grooves 428 is a surface facing opposite to the case first side surface 424a provided with the engagement protrusions 426. As shown in FIG. 13, the engagement protrusions 426 of another electronic device 410 can be engaged with the engagement grooves 428. That is, the engagement protrusions 426 and the engagement grooves 428 have a concave-convex relation in which they engage with each other.

Figure 12:
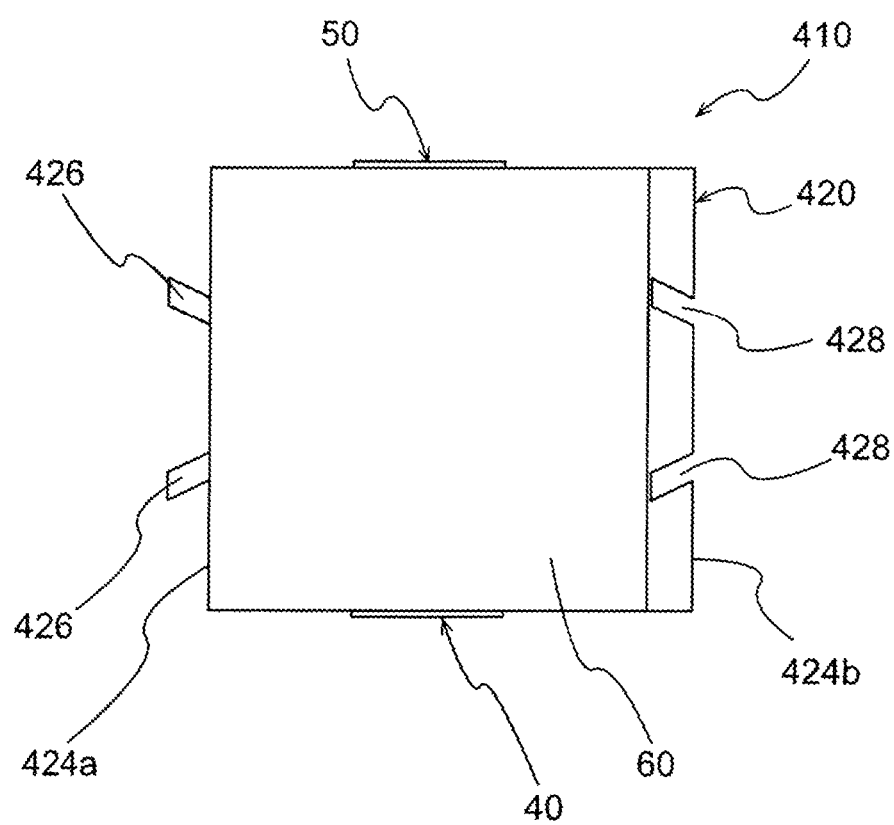
FIG. 12 is a plane view of the electronic device shown in FIG. 10 from above.

As shown in FIG. 12, which is a plane view of the electronic device 410 viewed from above, among substantially rectangular four side surfaces of the case 420 of the electronic device 410, terminal arm portions of the first metal terminal 40 and the second metal terminal 50 are arranged on a pair of opposing side surfaces. The engagement protrusions 426 and the engagement grooves 428 are formed on the case first side surface 424a and the case second side surface 424b as a pair of opposing side surfaces perpendicular to the side surfaces provided with the terminal arm portions of the metal terminals 40 and 50.

In the electronic device 410, as shown in FIG. 13, a plurality of electronic devices 410 can be integrally connected by engaging their engagement protrusions 426 and the engagement grooves 428 with each other. In the electronic device 410, a plurality of connected electronic devices 410 can be transported at once, for example, when transported to a mounting board using a mounting machine by connection as shown in FIG. 13, and the mounting efficiency can thus be increased. As for common respects with the electronic device 10, the electronic device 410 exhibits effects similar to those of the electronic device 10.

Hereinabove, the present invention is described with a plurality of embodiments, but the technical scope of the present invention is not limited to only those of the above-mentioned embodiments and examples. Needless to say, the present invention includes many other embodiments and modifications. The shape of each member shown in the embodiments is only an example and can be changed to another shape having a similar function.

Figure 14:
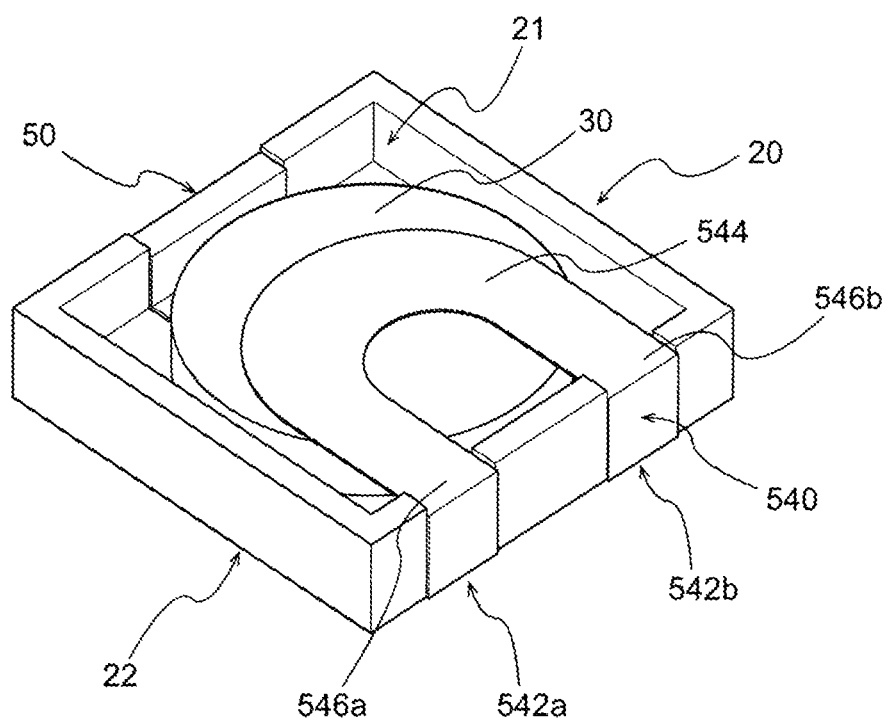
FIG. 14 is a schematic oblique view illustrating an internal state of a case of an electronic device according to Second Modification of the present invention.

FIG. 14 is a figure illustrating the shape of a first metal terminal 540 according to Second Modification and is an oblique view illustrating an electronic device including the first metal terminal 540 without a case cover. As shown in FIG. 14, the first metal terminal 540 is branched from one first electrode connection portion 544 to two first terminal arm portions 546a and 546b and two first mounting portions 542a and 542b. Thus, three terminals of two first mounting portions 542a and 542b and one second mounting portion 52 (see FIG. 2) appear in total on the case lower surface 22 of the electronic device shown in FIG. 14.

In this way, the mounting portion disposed on the case lower surface 22 is not limited to the combination of the first mounting portion 42 and the second mounting portion 52 as shown in FIG. 2. For example, an electronic device may be provided with three mounting portions 542a, 542b, and 52 on the case lower surface 22 by adopting the first metal terminal 540 as shown in FIG. 14 instead of the first metal terminal 40 shown in FIG. 2. The electronic device including three mounting portions 542a, 542b, and 52 has a good installation stability when installed at a mounting position or during reflow.

Fifth Embodiment

Figure 15:
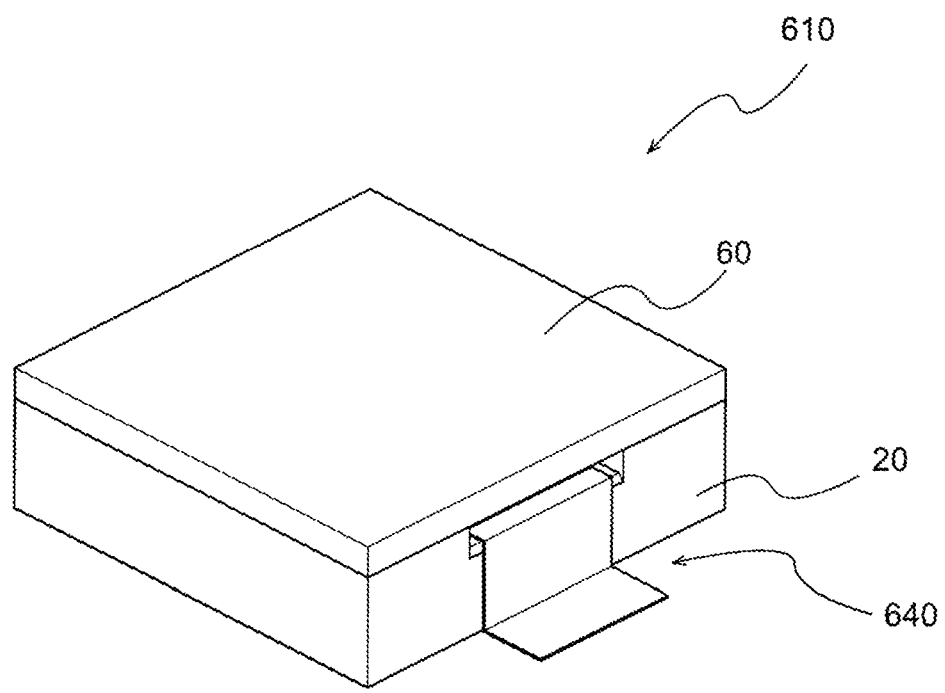
FIG. 15 is a schematic oblique view of an electronic device according to Fifth Embodiment of the present invention from diagonally above.
Figure 17:
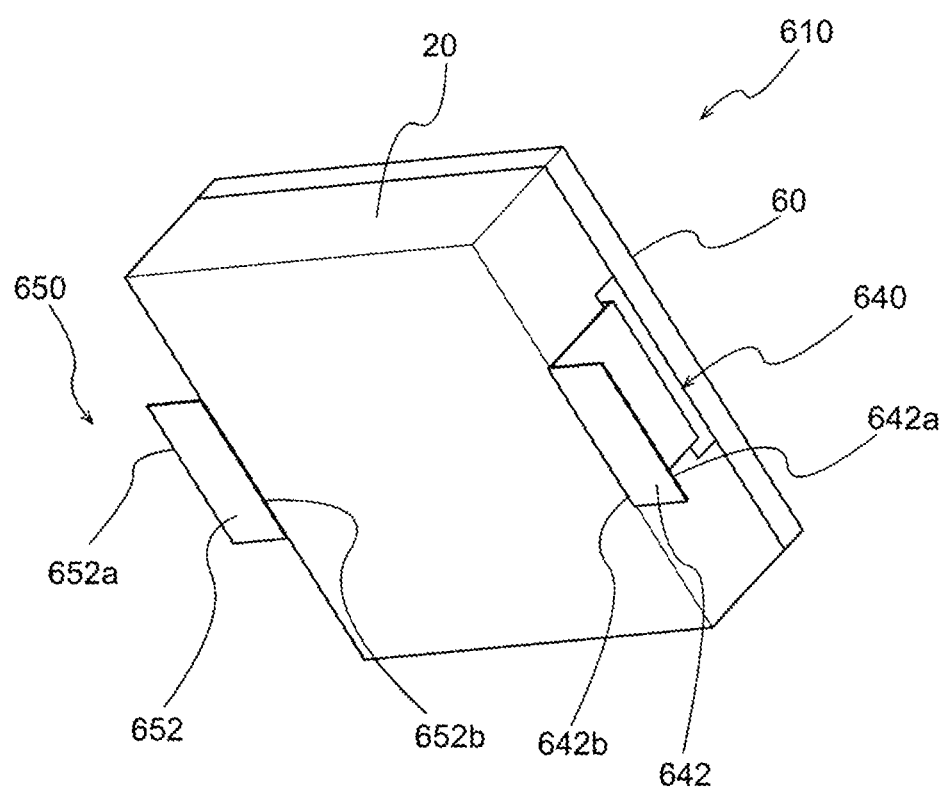
FIG. 17 is a schematic oblique view of the electronic device shown in FIG. 15 from diagonally below.

FIG. 15 and FIG. 17 are schematic oblique views of an electronic device 610 according to Fifth Embodiment of the present invention. FIG. 15 is an oblique view of the electronic component 610 as viewed from the case cover 60 side, and FIG. 17 is an oblique view of the electronic component 610 as viewed from the case lower surface 22 side. Except for the shapes of a first metal terminal 640 and a second metal terminal 650, the electronic device 610 is similar to the electronic device 10 according to First Embodiment shown in FIG. 1 etc. As for the electronic device 610, only the differences from the electronic device 10 are mainly described, and common respects with the electronic device 10 are not described.

Figure 16:
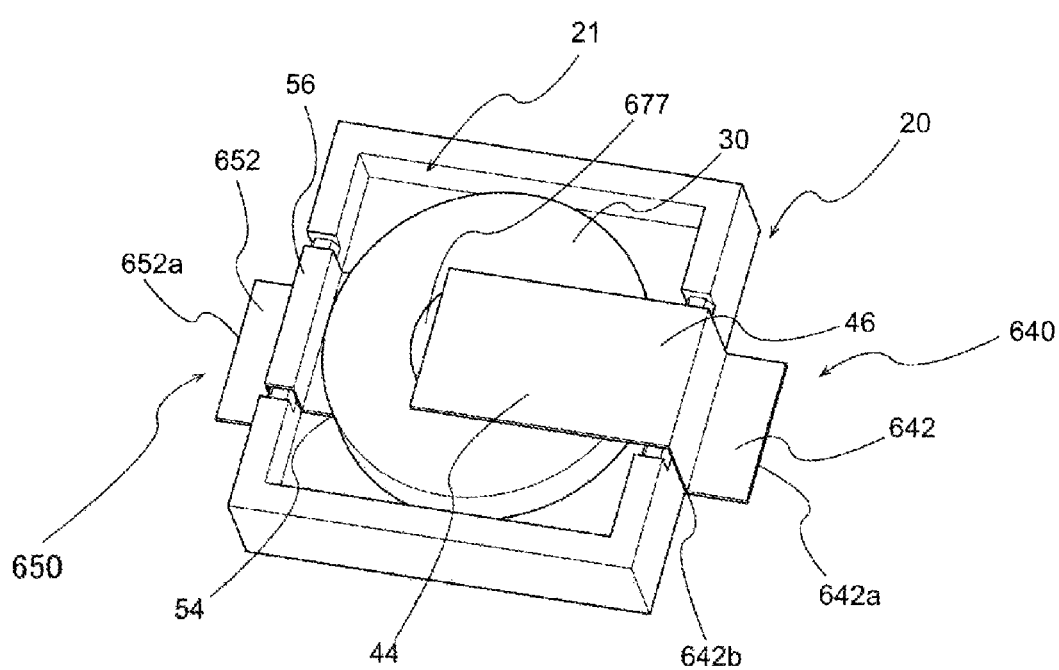
FIG. 16 is a schematic oblique view illustrating an internal state of a case of the electronic device shown in FIG. 15.

FIG. 16 is an oblique view illustrating the electronic device 610 shown in FIG. 15 other than the case cover 60. As shown in FIG. 16, similarly to the electronic device 10 shown in FIG. 3, the ceramic element 30 is accommodated in the recess 21 of the case 20.

As shown in FIG. 16 and FIG. 17, the electronic device 610 includes a pair of metal terminals 640 and 650. The first metal terminal 640 includes a first mounting portion 642 disposed next to the case lower surface 22, a first electrode connection portion 44 connected to the first electrode portion of the ceramic element 30, and a first terminal arm portion 46 connecting between the first mounting portion 642 and the first electrode connection portion 44. The first electrode connection portion 44 is bonded to the first electrode portion of the ceramic element 30 via a bonding material 677, such as solder and conductive adhesive. The first electrode connection portion 44 and the first terminal arm portion 46 of the first metal terminal 640 shown in FIG. 17 are similar to the first electrode connection portion 44 and the first terminal arm portion 46 of the first metal terminal 40 shown in FIG. 3.

As understood from comparison between FIG. 2 and FIG. 17, unlike the first mounting portion 42 of the first metal terminal 40 shown in FIG. 2, the first mounting portion 642 of the first metal terminal 640 is not disposed on the case lower surface 22, but is disposed next to the case lower surface 22. That is, a tip 642a of the first mounting portion 642 extends away from the case lower surface 22 with respect to a base end 642b of the first mounting portion 642.

The first mounting portion 642 is disposed on substantially the same plane as the case lower surface 22 or below the case lower surface 22. Similarly to the mounting portion 42 shown in FIG. 2, the first mounting portion 642 is substantially parallel to the first main surface 31a and the second main surface 31b (see FIG. 5) of the ceramic element 30.

The second metal terminal 650 shown in FIG. 16 includes a second mounting portion 652 disposed next to the case lower surface 22, a second electrode connection portion 54 connected to the second electrode portion of the ceramic element 30, and a second terminal arm portion 56 connecting between the second mounting portion 652 and the second electrode connection portion 54. The second electrode connection portion 54 and the second terminal arm portion 56 of the second metal terminal 650 shown in FIG. 17 are similar to the second electrode connection portion 54 and the second terminal arm portion 56 of the second metal terminal 50 shown in FIG. 3.

As shown in FIG. 17, similarly to the first mounting portion 642, the second mounting portion 652 of the second metal terminal 650 is disposed next to the case lower surface 22. That is, the second mounting portion 652 is disposed next to the case lower surface 22 on the other side of the first mounting portion 642. A tip 652a of the second mounting portion 652 extends away from the case lower surface 22 with respect to a base end 652b of the second mounting portion 652.

The second mounting portion 652 is disposed on substantially the same plane as the first mounting portion 642. Similarly to the mounting portion 52 shown in FIG. 2, the second mounting portion 652 is substantially parallel to the first main surface 31a and the second main surface 31b (see FIG. 5) of the ceramic element 30.

As shown in FIG. 15 to FIG. 17, the mounting portions 642 and 652 of the first metal terminal 640 and the second metal terminal 650 included in the electronic device 610 may be arranged next to the case lower surface 22 so as not to overlap with the case lower surface 22 when viewed from above. The electronic device 610 is advantageous for stability during mounting and ease of processing the first metal terminal 640 and the second metal terminal 650. Meanwhile, like the mounting portions 42 and 52 of the first metal terminal 40 and the second metal terminal 50 included in the electronic device 10 according to First Embodiment, the overlapping arrangement of the mounting portions 42 and 52 with the case lower surface 22 when viewed from above is advantageous for reducing the mounting area of the electronic device 10. As for common respects with the electronic device 10, the electronic device 610 exhibits effects similar to those of the electronic device 10.

DESCRIPTION OF THE REFERENCE NUMERICAL 10, 210, 310, 410, 610 . . . electronic device
20, 220, 320, 420 . . . case
21, 221, 321, 421 . . . recess
21a . . . opening
21b . . . corner
21c . . . bottom surface
22, 122 . . . case lower surface
122a . . . first recess groove
122b . . . second recess groove
424a . . . case first side surface
424b . . . case second side surface
426 . . . engagement protrusion
428 . . . engagement groove
30, 230, 330 . . . ceramic element
230a . . . first section
230b . . . second section
330a . . . first element portion
370a . . . second element portion
31a, 231a, 331a, 371a . . . first main surface
33, 233 . . . first electrode portion
31b, 231b, 331b, 371b . . . second main surface
34, 234 . . . second electrode portion
35, 235, 335, 375 . . . dielectric portion
235a . . . first dielectric portion
235b . . . second dielectric portion
236 . . . intermediate electrode portion
W1 . . . element thickness
W2 . . . recess depth
40, 240, 340, 540 . . . first metal terminal
42, 542a, 542b . . . first mounting portion
142a, 152a . . . tip
142b, 152b . . . base end
44, 244, 344, 544 . . . first electrode connection portion
344a . . . first element connection portion
344b . . . second element connection portion
46, 546a, 546b . . . first terminal arm portion
50, 250, 350 . . . second metal terminal
52 . . . second mounting portion
54, 254, 354 . . . second electrode connection portion
56 . . . second terminal arm portion
60, 260, 360 . . . case cover
61 . . . first space
62 . . . second space
63 . . . cover body
64 . . . protrusion

What is claimed is:

1. An electronic device comprising:
a case including a recess and a case lower surface facing opposite to an opening of the recess;
a ceramic element disposed in the recess and including:
 a first main surface and a second main surface opposing to each other;
 a first electrode portion formed on the first main surface; and
 a second electrode portion formed on the second main surface;
a first metal terminal including:
 a first mounting portion disposed on the case lower surface or next to the case lower surface and being substantially parallel to the first main surface and the second main surface; and
 a first electrode connection portion connected to the first electrode portion; and
a second metal terminal including:
 a second mounting portion disposed on the case lower surface or next to the case lower surface and being substantially parallel to the first main surface and the second main surface; and
 a second electrode connection portion connected to the second electrode portion, wherein
the first metal terminal includes a first terminal arm portion connecting the first mounting portion and the first electrode connection portion,
the second metal terminal includes a second terminal arm portion connecting the second mounting portion and the second electrode connection portion,
the first metal terminal extends along the first main surface from the first terminal arm portion to a case side surface on a same plane, the second metal terminal extends along an inner side surface of the case and a bottom surface of the recess from the second terminal arm portion, and a part of the second metal terminal extending to the bottom surface of the recess is interposed by the bottom surface in contact with one part of the second metal terminal and the second main surface in contact with another part of the second metal terminal.

2. The electronic device according to claim 1, further comprising a case cover for covering the opening, wherein
the first metal terminal passes through a first space formed between the case and the case cover, and
the second metal terminal passes through a second space formed between the case and the case cover and being away from the first space.

3. The electronic device according to claim 2, wherein the case cover is disposed corresponding to a corner of the opening and includes a plurality of protrusion portions for being inserted into the recess.

4. The electronic device according to claim 1, wherein a recess depth from the opening of the case to a bottom surface of the recess is larger than an element thickness as a distance between the first main surface and the second main surface.

5. The electronic device according to claim 1, wherein the ceramic element includes:
   a first section having the first main surface, the first electrode portion, and a first dielectric portion; and
   a second section having the second main surface, the second electrode portion, and a second dielectric portion, and
the first section and the second section are connected via an intermediate electrode portion.

6. The electronic device according to claim 1, wherein
the first mounting portion of the first metal terminal and the second mounting portion of the second metal terminal are arranged on the case lower surface, and
the case lower surface includes a recess groove facing at least one of the first mounting portion and the second mounting portion and having a changing groove depth.

7. The electronic device according to claim 6, wherein the recess groove unit includes:
   a first recess groove where a space formed with a tip of the first mounting portion is larger than a space formed with a base end of the first mounting portion; and
   a second recess groove where a space formed with a tip of the second mounting portion is larger than a space formed with a base end of the second mounting portion.

8. An electronic device comprising:
a case including a recess and a case lower surface facing opposite to an opening of the recess;
a ceramic element disposed in the recess and including:
   a first main surface and a second main surface opposing to each other;
   a first electrode portion formed on the first main surface; and
   a second electrode portion formed on the second main surface;
a first metal terminal including:
   a first mounting portion disposed on the case lower surface or next to the case lower surface and being substantially parallel to the first main surface and the second main surface; and
   a first electrode connection portion connected to the first electrode portion; and
a second metal terminal including:
   a second mounting portion disposed on the case lower surface or next to the case lower surface and being substantially parallel to the first main surface and the second main surface; and
   a second electrode connection portion connected to the second electrode portion, wherein
the first metal terminal includes a first terminal arm portion connecting the first mounting portion and the first electrode connection portion,
the first metal terminal extends along the first main surface from the first terminal arm portion to a case side surface on a same plane,
a case cover for covering the opening includes a plurality of protrusion portions corresponding to a corner of the opening, and
the plurality of the protrusion portions is inserted into the recess.

9. An electronic device comprising:
a case including a recess and a case lower surface facing opposite to an opening of the recess;
a ceramic element disposed in the recess and including:
   a first main surface and a second main surface opposing to each other;
   a first electrode portion formed on the first main surface; and
   a second electrode portion formed on the second main surface;
a first metal terminal including:
   a first mounting portion disposed on the case lower surface or next to the case lower surface and being substantially parallel to the first main surface and the second main surface; and
   a first electrode connection portion connected to the first electrode portion; and
a second metal terminal including:
   a second mounting portion disposed on the case lower surface or next to the case lower surface and being substantially parallel to the first main surface and the second main surface; and
   a second electrode connection portion connected to the second electrode portion, wherein
the ceramic element includes a first element portion and a second element portion each having the first main surface and the second main surface,
the first element portion and the second element portion are arranged so that their second main surfaces face each other,
the second electrode connection portion is interposed between the second main surfaces of the first element portion and the second element portion so as to be in contact with both of the second electrode portions of the first element portion and the second element portion,
the first electrode connection portion includes:
   a first element connection portion connected to the first electrode portion of the first element portion; and
   a second element connection portion connected to the first electrode portion of the second element portion, and
a part of the first metal terminal extending from the second element connection portion at a bottom surface of the recess is interposed by the bottom surface of the recess in contact with one part of the first metal terminal and the first main surface in contact with another part of the first metal terminal.

10. An electronic device comprising:
a case including a recess and a case lower surface facing opposite to an opening of the recess;
a ceramic element disposed in the recess and including:
   a first main surface and a second main surface opposing to each other;
   a first electrode portion formed on the first main surface; and
   a second electrode portion formed on the second main surface;
a first metal terminal including:
   a first mounting portion disposed on the case lower surface or next to the case lower surface and being substantially parallel to the first main surface and the second main surface; and
   a first electrode connection portion connected to the first electrode portion; and
a second metal terminal including:
   a second mounting portion disposed on the case lower surface or next to the case lower surface and being substantially parallel to the first main surface and the second main surface; and
   a second electrode connection portion connected to the second electrode portion, wherein
the ceramic element includes a first element portion and a second element portion each having the first main surface and the second main surface,
the first element portion and the second element portion are arranged so that their second main surfaces face each other,
the second electrode connection portion is interposed between the second main surfaces of the first element portion and the second element portion so as to be in contact with both of the second electrode portions of the first element portion and the second element portion,
the first electrode connection portion includes:
   a first element connection portion connected to the first electrode portion of the first element portion; and
   a second element connection portion connected to the first electrode portion of the second element portion,
   the first metal terminal has a first terminal arm portion connecting the first mounting portion and the first electrode connection portion, and
   the first metal terminal extending to the first element connection portion extends along the first main surface from the first terminal arm portion to a case side surface on a same plane.

* * * * *